United States Patent
Mundt et al.

(10) Patent No.: US 8,990,449 B2
(45) Date of Patent: Mar. 24, 2015

(54) SYSTEMS AND METHODS FOR OUT OF BAND NOTIFICATION OF HARD DRIVE STATUS CHANGE

(75) Inventors: Kevin Mundt, Austin, TX (US); Frank Widjaja Yu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 13/471,889

(22) Filed: May 15, 2012

(65) Prior Publication Data

US 2013/0311683 A1    Nov. 21, 2013

(51) Int. Cl.
*G06F 11/00* (2006.01)
*G06F 3/00* (2006.01)
*G06F 11/07* (2006.01)

(52) U.S. Cl.
CPC ........ *G06F 11/0787* (2013.01); *G06F 11/0775* (2013.01)
USPC .................................. 710/18; 710/19; 714/48

(58) Field of Classification Search
CPC ........................ G06F 11/0775; G06F 11/0787
USPC ............................................... 710/19; 714/48
See application file for complete search history.

(56) References Cited

U.S. PATENT DOCUMENTS

| | | | |
|---|---|---|---|
| 7,450,027 B1 * | 11/2008 | Overby ...................... 340/815.4 |
| 7,590,781 B2 * | 9/2009 | Ting ................................ 710/74 |
| 7,802,019 B2 * | 9/2010 | Shu et al. .......................... 710/8 |
| 8,260,976 B1 * | 9/2012 | Dhandapani .................... 710/15 |
| 8,751,836 B1 * | 6/2014 | Piszczek et al. .............. 713/300 |
| 2007/0058279 A1 * | 3/2007 | Duerk et al. ..................... 360/69 |
| 2007/0239908 A1 * | 10/2007 | Carlson .......................... 710/62 |
| 2008/0228959 A1 * | 9/2008 | Wang .............................. 710/22 |
| 2010/0005211 A1 * | 1/2010 | Wen et al. ...................... 710/302 |
| 2010/0290145 A1 | 11/2010 | Ahmad et al. |

* cited by examiner

*Primary Examiner* — Ernest Unelus
(74) *Attorney, Agent, or Firm* — Baker Botts L.L.P.

(57) ABSTRACT

Systems and methods for out of band notification of a hard drive status change may be provided. In accordance with embodiments of the present disclosure, an information handling system may include a processor, a memory communicatively coupled to the processor, a hard disk drive communicatively coupled to the processor via an input/output (I/O) bus for communicating I/O data between the processor and the hard disk drive, and an indicator configured to provide a user-detectable indication of I/O activity occurring on the I/O bus. The hard disk drive may include general purpose input/output (GPIO) terminal independent from the I/O bus and communicatively coupled to the processor, and the hard disk drive may be configured to assert the GPIO terminal in response to an occurrence of a status event of the hard disk drive.

14 Claims, 2 Drawing Sheets

SYSTEMS AND METHODS FOR OUT OF BAND NOTIFICATION OF HARD DRIVE STATUS CHANGE

TECHNICAL FIELD

The present disclosure relates in general to information handling systems, and more particularly to providing user selection of associations between information handling resources and information handling systems in an integrated chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include hard drives for storing instructions and data. In many information handling systems, it is desirable for hard drives to be able to communicate status information to a processor of the information handling system. For example, a processor may query a hard drive for the internal temperature of the hard drive, so that the processor may set an appropriate fan speed for appropriately cooling the hard drive. Traditional approaches of communicating drive status are "in-band" methods, in which the processor queries a hard drive for status information over an input/output (I/O) bus for which data communications between the processor and hard drive are undertaken, and the hard drive responds with status via the I/O bus. This approach requires continual polling of the hard drive status or require that the hard drive continually broadcast status information. Because such polling and/or broadcasting uses the data path of the I/O bus used for data transfer (e.g., reads and writes of data), data I/O throughput is negatively affected.

SUMMARY

In accordance with the teachings of the present disclosure, the disadvantages and problems associated with communication notification of a hard drive status change have been reduced or eliminated.

In accordance with embodiments of the present disclosure, an information handling system may include a processor, a memory communicatively coupled to the processor, a hard disk drive communicatively coupled to the processor via an input/output (I/O) bus for communicating I/O data between the processor and the hard disk drive, and an indicator configured to provide a user-detectable indication of I/O activity occurring on the I/O bus. The hard disk drive may include general purpose input/output (GPIO) terminal independent from the I/O bus and communicatively coupled to the processor, and the hard disk drive may be configured to assert the GPIO terminal in response to an occurrence of a status event of the hard disk drive.

In accordance with these and other embodiments of the present disclosure, a method may include asserting a general purpose input/output (GPIO) terminal of a hard disk drive in response to an occurrence of a status event of the hard disk drive, the GPIO terminal independent from an input/output (I/O) bus used for communicating I/O data between the hard disk drive and a processor. The method may also include querying, by the processor, the hard disk drive for a status update in response to detecting the assertion of the GPIO terminal. The method may further include communicating status information from the hard disk drive to the processor in response to receiving the query.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
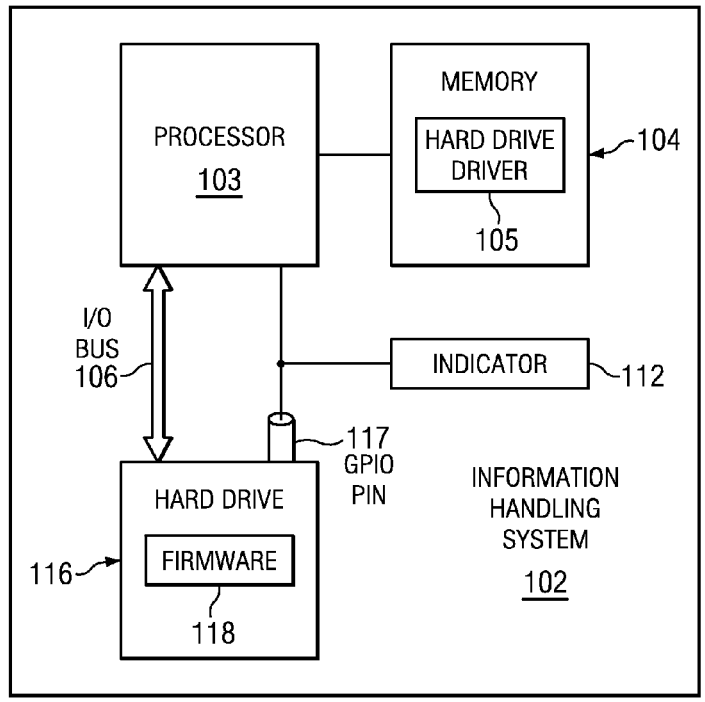
FIG. 1 illustrates a block diagram of an example information handling system, in accordance with certain embodiments of the present disclosure.

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks (RAID), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example information handling system 102, in accordance with certain embodiments of the present disclosure. In certain embodiments, information handling system 102 may comprise a computer chassis or enclosure (e.g., a server chassis holding one or more server blades). In other embodiments, information handling system 102 may be a personal computer (e.g., a desktop computer or a portable computer). As depicted in FIG. 1, information handling system 102 may include a processor 103, a memory 104 communicatively coupled to processor 103, an indicator 112, and a hard drive 116 communicatively coupled to processor 103 via I/O bus 106. These components of information handling system 102 and/or other components may be mounted to a motherboard, a printed circuit board, or other suitable device that provides connectivity among such components.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by memory 104 and/or another component of information handling system 102.

Memory 104 may be communicatively coupled to processor 103 and may comprise any system, device, or apparatus configured to retain program instructions or data for a period of time (e.g., computer-readable media). Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to information handling system 102 is withdrawn. As shown in FIG. 1, memory 104 may have stored thereon a hard drive driver 105. Hard drive driver 105 may comprise any program of instructions that when executed by a processor (e.g., processor 103) acts translator between hard drive 116 and an operating system and/or application executing on processor 103.

Indicator 112 may comprise any system, device, or apparatus configured to provide an indication of an event to a user of information handling system 102. For example, indicator 112 may comprise a speaker capable of emitting a sound or a light capable of emitting visible light (e.g., a light-emitting diode). In some embodiments, indicator 112 may be configured to indicate activity of drive 116 (e.g., I/O operations taking place between processor 103 and hard drive 116), as described in greater detail below.

Hard drive 116 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). As shown in FIG. 1, hard drive 116 may comprise a general purpose input/output (GPIO) terminal 117 and firmware 118.

As shown in FIG. 1 hard drive 116 may be coupled to processor 103 via I/O bus 106. I/O bus 106 may comprise any system, device, or apparatus configured to transfer I/O data between I/O hard drive 116 and processor 103. For example, I/O bus 112 may include a serial advanced technology attachment (SATA) bus, a Peripheral Component Interconnect (PCI)/Personal Computer Memory Card International Association bus, Universal Serial Bus (USB), a Small Computer System Interface (SCSI) bus, a serial attached SCSI (SAS) bus, FireWire (IEEE 1394) bus, InfiniBand bus, or any other suitable bus.

GPIO terminal 117 may comprise a terminal for communicating signals to and from hard drive 116 other than input/output (I/O) data carried over I/O bus 106. In implementations of information handling system 102 in accordance with either of the SAS or SATA standards, GPIO terminal 117 may comprise pin 11 of the SAS specification or SATA specification, as appropriate. As is often the case in traditional information handling systems, GPIO terminal 117 may be coupled between hard drive 116 and indicator 112, such that when read-write activity is occurring on hard drive 116, hard drive 116 may assert GPIO terminal 117, causing indicator 112 to provide an indication of hard drive activity (e.g., if implemented as a light-emitting diode, indicator may emit light if GPIO pin is asserted). As an example, if indicator 112 is implemented as a light-emitting diode, hard drive 116 may assert GPIO terminal 117 such that indicator 112 "flickers" on and off to indicate hard drive activity.

Firmware 118 may include a program instructions executable by a controller, processor, or other similar device of hard drive 116 that may control the operation of hard drive 116 and its various components, including without limitation, GPIO terminal 117. For example, the assertion of GPIO terminal 117 in response to hard drive I/O activity referenced above may be controlled by firmware 118. In addition, and as described in greater detail in FIG. 2 below, in embodiments of the present disclosure, firmware 118 may be configured to control GPIO terminal 117 such that GPIO terminal 117 is asserted to indicate to processor 103 that hard drive 116 has a status notification for processor 103 (e.g., a change in internal temperature of hard drive 116). Also, and as described in greater detail in FIG. 2 below, hard drive driver 105 executing on processor 103 may be configured to receive the status notification via GPIO 117 and distinguish the status notification assertion from drive I/O assertions intended to flicker indicator 112.

Figure 2:
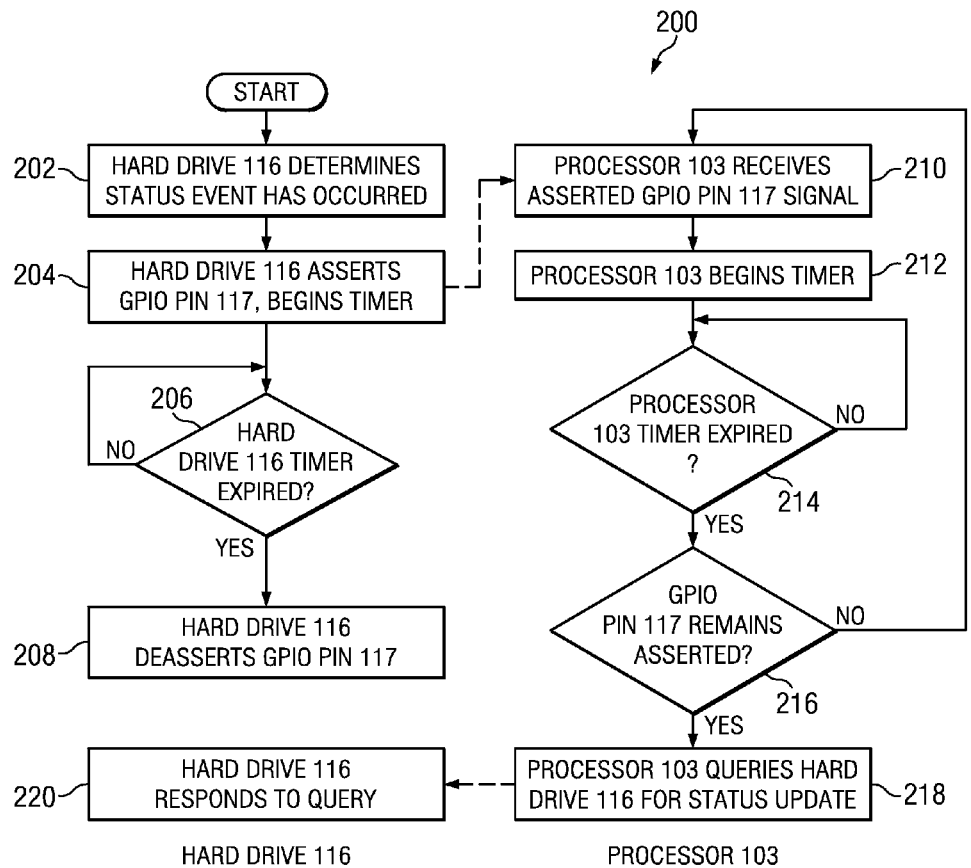
FIG. 2 illustrates a flow chart of an example method for out of band notification of hard drive status change, in accordance with certain embodiments of the present disclosure.

FIG. 2 illustrates a flow chart of an example method 200 for out of band notification via GPIO terminal 117 of hard drive status change, in accordance with certain embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps 202-220 comprising method 200 may depend on the implementation chosen. As shown in FIG. 2, steps 202-208 and 220 of method 200 may be performed by hard drive 116 or one or more components thereof (e.g., firmware 118) and steps 210-218 of method 200 may be performed by processor 103 and or components thereof (e.g., hard drive driver 105 executing on processor 103).

At step 202, hard drive 116 may determine that a status event (e.g., temperature change) has occurred. At step 204, hard drive 116 may assert GPIO terminal 117 and begin a timer. The timer may have a duration such that the duration is longer than the period of time that hard drive 116 asserts GPIO terminal 117 in response to drive activity (e.g., the timer duration is longer than the duration of a single "flicker" of indicator 112).

At step 206, hard drive 116 may determine whether the timer has expired. If the timer has not expired, step 206 may repeat until the timer has expired. Otherwise, once the timer has expired, method 200 may proceed to step 208. At step 208, in response to completion of the timer, hard drive 116 may deassert GPIO terminal 117. As a result, in response to the occurrence of a status event, hard drive 116 may assert GPIO terminal 117 (and thus activate indicator 112) for a duration longer than that for which GPIO terminal 117 is asserted in response to drive activity, but not so long that a user of information handling system 102 may notice that indicator 112 has remained activated for an inordinate amount of time. Thus, as is seen below, the difference between assertion of GPIO terminal 117 due to I/O activity and assertion of GPIO terminal 117 due to a status event may be determined by processor 103.

At step 210, processor 103 may receive an asserted signal from GPIO terminal 117. At step 212, in response to receiving as asserted GPIO terminal 117 signal, processor 103 may begin a timer. At step 214, processor 103 may determine whether the timer has expired. If the timer has not expired, step 214 may repeat until the timer has expired. Otherwise, once the timer has expired, method 200 may proceed to step 216. At step 216, in response to expiration of the timer, processor 103 may determine if GPIO terminal 117 has remained asserted during the duration of the timer. The duration of the processor 103 timer may be longer than the period of time that hard drive 116 asserts GPIO terminal 117 in response to drive activity (e.g., the processor time duration is longer than the duration of a single "flicker" of indicator 112) but shorter than the duration of the hard drive 116 timer. If GPIO terminal 117 has remained asserted throughout the duration of the processor timer, method 200 may proceed to step 218. Otherwise, if GPIO terminal 117 did not remain asserted throughout the duration of the processor time, method 200 may proceed again to step 210.

At step 218, in response to a determination that GPIO terminal 117 remained asserted during the duration of the processor timer, processor 103 may query hard drive 116 for a status update. By initiating a query only in response to receiving a GPIO terminal 117 assertion for longer than the processor timer duration, processor 103 appropriately discerns between GPIO terminal 117 assertions occurring as a result of hard drive 116 I/O activity and hard drive 116 status notifications.

At step 220, in response to the query from processor 103, hard drive 116 may respond to the query with status information. After completion of step 220, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. In some embodiments, certain steps of method 200 may execute contemporaneously. For example, in some embodiments, portions of steps 206 and 208 may execute simultaneously with portions of steps 210-216.

Method 200 may be implemented using information handling system 100 or any other system operable to implement method 200. In certain embodiments, method 200 may be implemented partially or fully in software and/or firmware embodied in computer-readable media.

Figure 3:
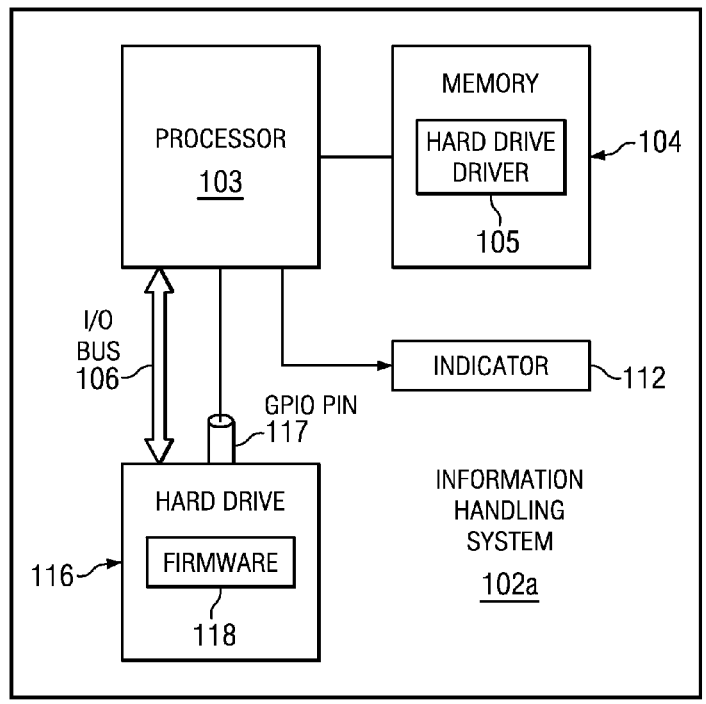
FIG. 3 illustrates a block diagram of another example information handling system, in accordance with certain embodiments of the present disclosure.

FIG. 3 illustrates a block diagram of another example information handling system 102a, in accordance with certain embodiments of the present disclosure. Information handling system 102a depicted in FIG. 3 is similar in structure and functionality to information handling system 102 depicted in FIG. 1, with major differences being that GPIO terminal 117 is communicatively coupled to processor 103 and not indicator 112, and processor 103 is communicatively coupled to indicator 112. In the embodiments represented by FIG. 3, hard drive 116 does not assert GPIO terminal 117 in response to I/O activity, but will assert GPIO terminal 117 in response to a status event. Thus, instead of being activated by GPIO terminal 117, indicator 112 is activated by processor 103, which may communicate a signal to indicator 112 in response to I/O activity occurring between processor 103 and hard drive 116 via I/O bus 106. Thus, indicator 112 may indicate drive activity to a user, while GPIO terminal 117 may be used to communicate an occurrence of a status event.

Figure 4:
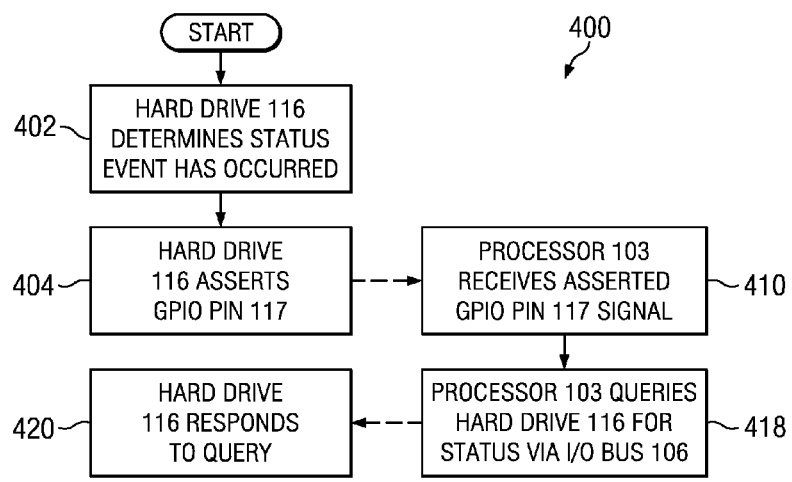
FIG. 4 illustrates a flow chart diagram of another example method for out of band notification of hard drive status change, in accordance with certain embodiments of the present disclosure.

FIG. 4 illustrates a flow chart of an example method 400 for out of band notification via GPIO terminal 117 of hard drive status change, in accordance with certain embodiments of the present disclosure. According to one embodiment, method 400 may begin at step 202. As noted above, teachings of the present disclosure may be implemented in a variety of configurations of information handling system 102. As such, the preferred initialization point for method 400 and the order of the steps 402-420 comprising method 400 may depend on the implementation chosen. As shown in FIG. 4, steps 402, 404, and 420 of method 400 may be performed by hard drive 116 or one or more components thereof (e.g., firmware 118) and steps 410 and 418 of method 400 may be performed by processor 103 and or components thereof (e.g., hard drive driver 105 executing on processor 103).

At step 402, hard drive 116 may determine that a status event (e.g., temperature change) has occurred. At step 404, hard drive 116 may assert GPIO terminal 117. At step 410, processor 103 may receive an asserted signal from GPIO terminal 117.

At step 418, in response to receiving an asserted signal from GPIO terminal 117, processor 103 may query hard drive 116 for a status update. At step 420, in response to the query from processor 103, hard drive 116 may respond to the query with status information. After completion of step 420, method 400 may end.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Although the present disclosure has been described in detail, it should be understood that various changes, substitutions, and alterations can be made hereto without departing from the spirit and the scope of the disclosure as defined by the appended claims. For example, although discussion above has been targeted toward communication of status messages from hard drives, the systems and methods disclosed herein may be generally applicable to other components of an information handling system.

What is claimed is:

1. An information handling system comprising:
   a processor;
   a memory communicatively coupled to the processor;
   a hard disk drive communicatively coupled to the processor via an input/output (I/O) bus for communicating I/O data between the processor and the hard disk drive, the hard disk drive comprising a general purpose input/output (GPIO) terminal independent from the I/O bus and communicatively coupled to the processor, and the hard disk drive configured to:
      assert the GPIO terminal for a first duration in response to I/O activity occurring on the I/O bus;
      assert the GPIO terminal for a second duration in response to a change in temperature of the hard disk drive, wherein the second duration is longer than the first duration; and
   an indicator light configured to provide a visible user-detectable indication of I/O activity occurring on the I/O bus in direct response to assertion of the GPIO terminal,
   wherein the hard disk drive is further configured to start a timer to elapse the second duration.

2. An information handling system according to claim 1, the processor configured to:
   detect assertion of the GPIO terminal;
   determine a duration of assertion of the GPIO terminal; and
   query the hard disk drive for a status update in response to determining the duration of the assertion of the GPIO terminal is longer than the first duration.

3. An information handling system according to claim 2, the hard disk drive further configured to communicate status information to the processor in response to receiving the query.

4. An information handling system according to claim 1, the processor configured to:
   cause the indicator light to provide the visible user-detectable indication of I/O activity in response to I/O activity occurring on the I/O bus;
   detect assertion of the GPIO terminal;
   query the hard disk drive for a status update in response to detecting the assertion of the GPIO terminal.

5. An information handling system according to claim 4, the hard disk drive further configured to communicate status information to the processor in response to receiving the query.

6. An information handling system according to claim 1, the hard disk drive comprising one of a Serial Attached Small Computer System Interface (SAS) hard disk drive and a Serial Advanced Technology Attachment (SATA) hard disk drive.

7. An information handling system according to claim 6, the GPIO terminal comprising pin 11 of the hard disk drive in accordance with one of the SAS specification and SATA specification.

8. An information handling system according to claim 1, the indicator light comprising a light emitting diode.

9. A method comprising:
   asserting a general purpose input/output (GPIO) terminal for a first duration in response to I/O activity occurring on an input/output (I/O) bus used for communicating I/O data between the hard disk drive and a processor;
   asserting the GPIO terminal of a hard disk drive for a second duration in direct response to change in temperature of the hard disk drive, the GPIO terminal independent from the I/O bus, wherein the second duration is longer than the first duration, the GPIO terminal communicatively coupled to an indicator light to provide a visible user-detectable indication in direct response to assertion of the GPIO terminal, and including starting a timer to elapse the second duration;
   querying, by the processor, the hard disk drive for a status update in response to detecting the assertion of the GPIO terminal; and
   communicating status information from the hard disk drive to the processor in response to receiving the query.

10. A method according to claim 9, further comprising:
    determining, by the processor, a duration of assertion of the GPIO terminal; and
    query the hard disk drive for the status update in response to determining the duration of the assertion of the GPIO terminal is longer than the first duration.

11. A method according to claim 10, further comprising communicating, by the hard disk drive, status information to the processor in response to receiving the query.

12. A method according to claim 9, further comprising causing, by the processor, the indicator light to provide the visible user-detectable indication of I/O activity in response to I/O activity occurring on the I/O bus.

13. A method according to claim 9, the hard disk drive comprising one of a Serial Attached Small Computer System Interface (SAS) hard disk drive and a Serial Advanced Technology Attachment (SATA) hard disk drive.

14. A method according to claim 13, the GPIO terminal comprising pin 11 of the hard disk drive in accordance with one of the SAS specification and SATA specification.

* * * * *